United States Patent [19]

Lenk et al.

[11] 3,731,275

[45] May 1, 1973

[54] DIGITAL SWITCHING NETWORK

[75] Inventors: Pedro A. Lenk, Rochester; William C. Dunn, Pittsford; Ramses R. Mina, Rochester, all of N.Y.

[73] Assignee: Stromberg-Carlson Corporation, Rochester, N.Y.

[22] Filed: Sept. 3, 1971

[21] Appl. No.: 177,743

[52] U.S. Cl....340/146.1 AB, 340/147 R, 340/166 R

[51] Int. Cl. ............................................G11c 29/00

[58] Field of Search.................340/146.1 AB, 166 R, 340/147 R

[56] References Cited

UNITED STATES PATENTS

| | | | |
|---|---|---|---|
| 3,381,270 | 4/1968 | Huffman et al. | 340/146.1 AB |
| 3,337,849 | 8/1967 | Lowry | 340/146.1 AB |
| 3,428,945 | 2/1969 | Toy | 340/146.1 AB |
| 3,460,092 | 8/1969 | Davidson et al | 340/146.1 AB |
| 3,532,976 | 10/1970 | Adelaar et al. | 340/166 R |

*Primary Examiner*—Charles E. Atkinson
*Attorney*—Craig, Antonelli & Hill

[57] ABSTRACT

A solid state semiconductor matrix switch for transmitting digital data from a set of input-output leads to any one of a number of output-input leads includes circuitry for marking and selecting cross point circuits through the network of the switch. In addition, circuitry for holding selected crosspoints after mark signals have been removed is employed. Typically, the switch includes an 8 X 8 matrix array of cross point circuits which are capable of providing eight individual paths through the matrix, no two operated crosspoints being located in any vertical or horizontal matrix strip. In addition, a circuit for checking the vertical matrix strips to determine which of the crosspoint circuits are completed is included. Also, an error checking system is employed to determine if more than a single crosspoint circuit in any one of the vertical matrix strips is operates.

24 Claims, 4 Drawing Figures

INVENTORS
PEDRO A. LENK
WILLIAM C. DUNN
RAMSES R. MINA

BY Craig, Antonelli & Hill
ATTORNEYS

Patented May 1, 1973 3,731,275

3 Sheets-Sheet 2

INVENTORS
PEDRO A. LENK
WILLIAM C. DUNN
RAMSES R. MINA

BY Craig, Antonelli & Hill

ATTORNEYS

INVENTORS
PEDRO A. LENK
WILLIAM C. DUNN
RAMSES R. MINA

BY Craig, Antonelli & Hill

ATTORNEYS

DIGITAL SWITCHING NETWORK

The invention pertains to a solid state semiconductor matrix switch for the transmission of digital data from a set of input/output leads to any one set of output/input leads. The output/input set of leads is selected by a number of control leads.

When compared to electro mechanical relay matrices one of the desirable characteristics of present-day electronic digital switching matrices is the ability to perform duplex switching, in a minimum of space i.e., provide a reliable signal path in both X and Y directions of the matrix, reliability and compactness. Integrated circuits offer specific advantages in the above categories, hence many switching matrices are formed on integrated circuit chips. The functions which each switch is to perform necessarily limit the degree to which a switch can be reduced in size, since specific logic elements must be incorporated into the switch where a particular function demands them. To overcome some of the size limitations of an integrated circuit system, use is made of large scale integration which also gives higher reliability and requires less power.

Accordingly, it is an object of the present invention to provide a space divided crosspoint switch which employs a plurality of available input and output lines in a relatively compact arrangement.

It is a further object of the present invention to provide a space divided digital switch incorporating error detecting circuitry, so as to indicate the closure of more than one set of crosspoints within a single switching matrix path, if such a condition exists.

It is another object of the present invention to provide a space divided digital switch handling digital data which is readily adaptable for use in a crosspoint path connecting network.

It is still an additional object of the present invention to provide a space divided digital switch which permits duplex signal transmission and control.

In accordance with one embodiment of the present invention, the matrix switch includes a circuit for marking and selecting crosspoint circuits through the network and a circuit for holding the selected crosspoint circuits after the mark signals have been removed. The hold signal can be applied simultaneously with the mark signals, or after the crosspoint circuit is picked up by the mark signals but before the mark signals are removed.

With the matrix switch of the invention and considering an 8 × 8 matrix switch, for example, eight crosspoint circuits can be set in the operated condition to provide eight individual paths through the matrix switch provided that no two operated crosspoint circuits are located in any one vertical strip or horizontal matrix strip.

The invention also includes a circuit for checking the vertical matrix strips to determine which of the crosspoint circuits are completed. If only one crosspoint circuit is operated in a checked vertical matrix strip, the circuit identifies the horizontal matrix strip in which the operated crosspoint device is located. If more than one crosspoint circuit is operated in the checked vertical matrix strip, the circuit provides a signal indicating this multiple operation condition and a hold signal which has been applied to the vertical matrix strip is released so as to drop out the multiple connection.

Furthermore, if more than one crosspoint circuit in any one vertical matrix strip is operated, the horizontal matrix strip identification data from the circuit is undefined. Of course, when no crosspoint circuit has been operated, no hold signal is present.

If more than one crosspoint circuit is operated in any one horizontal matrix strip, the same horizontal matrix strip will be identified several times as the individual vertical matrix strips are checked. This information will be transmitted to the system control along with the identity of the vertical matrix strips so that the hold signal to these vertical matrix strips can be released.

These and other objects, features and advantages of the present invention will become more apparent from the following detailed description thereof, taken in conjunction with the accompanying drawings, which illustrate one embodiment of the present invention and wherein.

Figure 1:
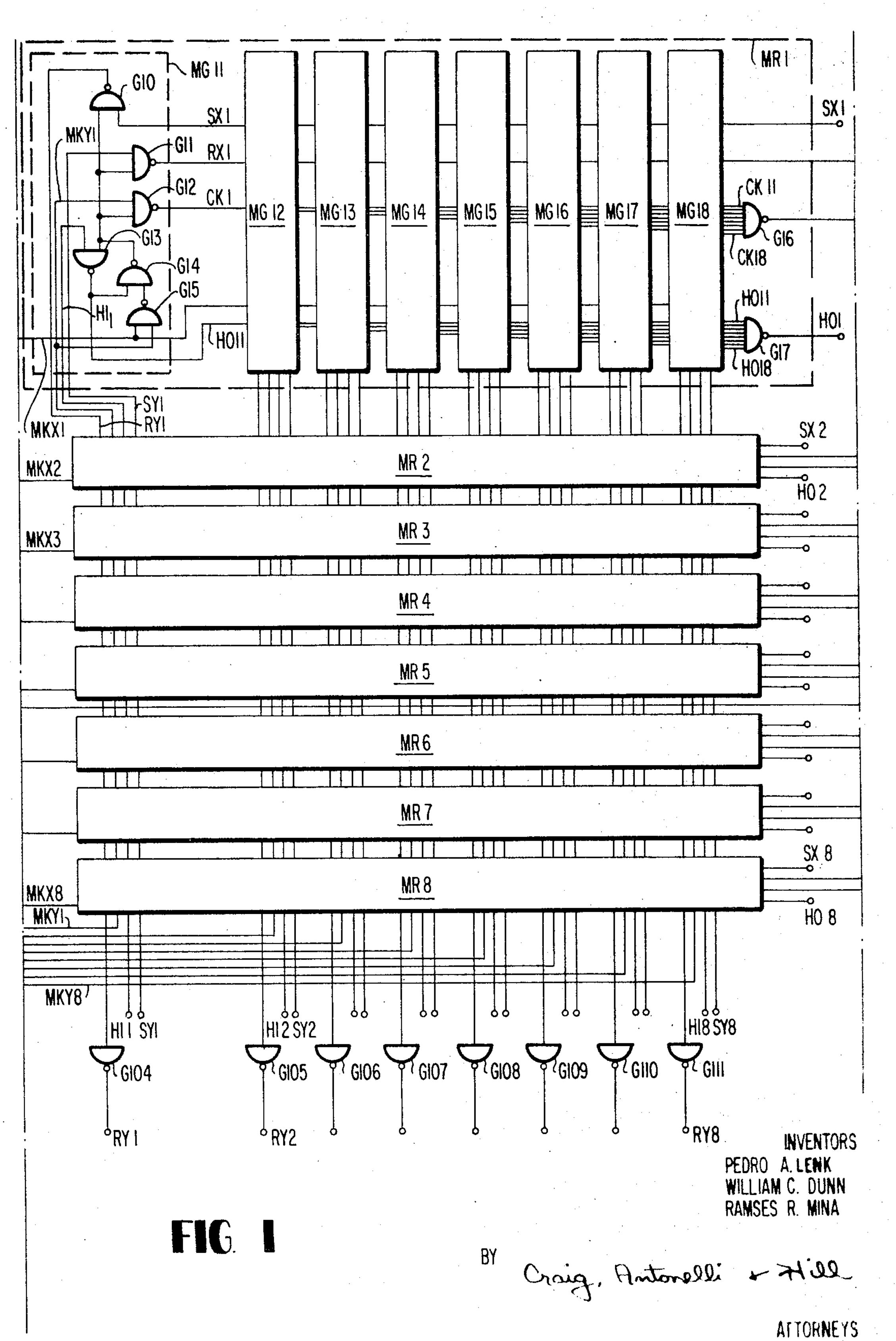
FIGS. 1–3 depict the digital circuitry employed in the present invention.

As shown in FIG. 1, each digital matrix comprises an 8 × 8 array of gating logic circuits arranged in vertical and horizontal rows of strips to form the crosspoint circuits of the switch. Only an individual crosspoint circuit MG11 has been shown in detail in FIG. 1, the remaining crosspoint circuits being internally identical therewith. Crosspoint circuit MG11 is contained within a first matrix row MR1, the other rows represented in block diagram form as MR2–MR8. The matrix rows MR1-MR8 extend across all the vertical matrix columns to define a crosspoint circuit at each crossing. To provide duplex transmission capabilities both the X and Y connections include send and receive terminals, SX1, SY1, and RX1, RY1, respectively.

Each crosspoint circuit has connected thereto four basic input leads and four output leads. These are for the horizontal or X connections of the crosspoint circuit MG11, a "send X" line SX1, a "receive X" line RX1, a "mark X" line MKX1 and a "hold output" line HO are provided. Similarly, for the vertical or Y connections, a "send Y" line SY1, a "receive Y" lead RY1, a "mark Y" lead MKY1 and a "hold input" lead HI1 are provided. In addition, an error detection output lead CK is included for each crosspoint circuit to detect the closing of more than one crosspoint in any single vertical matrix column or strip.

Each of the error detection or check output leads from the separate crosspoint circuits in each row are applied to a common gate. As is shown in FIG. 1, for example, the check $CK_{11}$ output of crosspoint circuit MG11 and the $CK_{12}$ – $CK_{18}$ leads of crosspoint circuits MG 12 – MG18 are delivered to gate circuit G16. Gate circuit 16, like the other gate circuits shown in the figures, comprises NAND type logic. Similarly, the hold output lines $HO_{11}$ –$HO_{18}$ from the gate circuit G13 and the corresponding respective gate circuits within the crosspoint circuits MG12–MG18 are fed to gage circuit G17. Thus, in an eight by eight matrix switch arrangement of 64 crosspoint circuits, as depicted in FIG. 1, the matrix switch contains eight mark leads MKX1–MKX8 for the horizontal of X connections, eight input or send data leads SX1–SX8 for the horizontal or X paths, eight output leads RX1–RX8 for the horizontal or X receive data connections, eight error detection leads CK1–CK8 and eight output hold leads $HO_{11}$ – $HO_{18}$. For the vertical or Y connections, each 8 × 8 matrix switch includes 8 mark leads MKY1–MKY8, 8 send data leads SY1–SY 8, 8 receive Y data leads RY1–RY8 and 8 input holds leads $HI_1$–$HI_8$.

As is shown in FIG. 1, the send SX, SY and receive RX, RY leads for both X and Y connections, are common to each respective row and column within the matrix. Each input hold lead HIn is common for a column of crosspoint circuits and is connected to the gating circuit of each crosspoint circuit which corresponds to gating circuit G13, shown within the dotted line portion of crosspoint circuit MG11. Furthermore, the horizontal and vertical mark leads for each respective row and column are connected in common to the gating circuits corresponding to the positions of gating circuits G15 and G12, respectively, of crosspoint circuit MG11.

Figure 2:
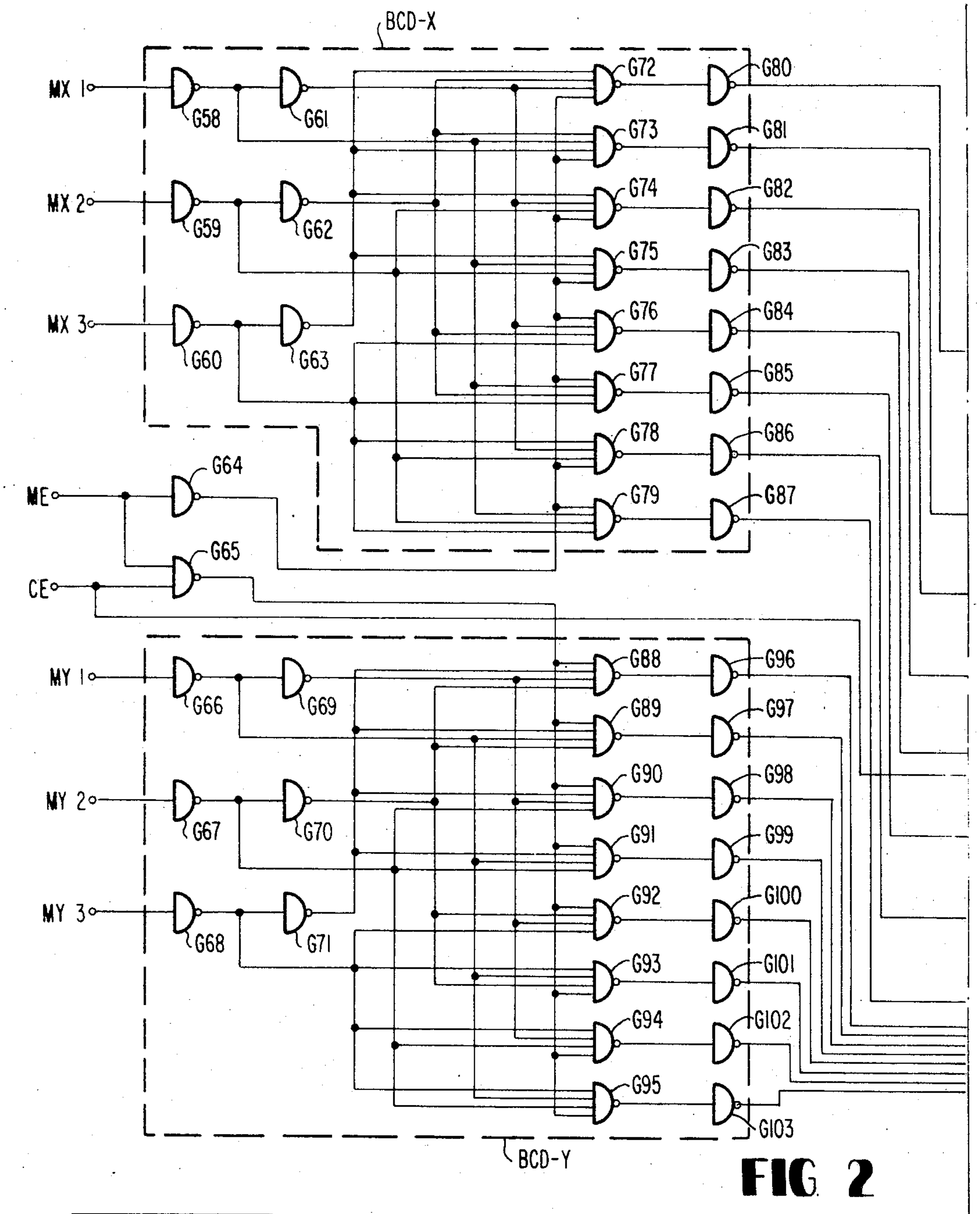
Figure 4:
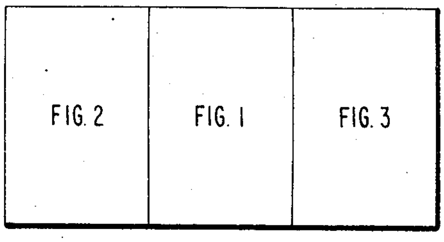
FIG. 4 shows the manner in which FIGS. 1–3 should be arranged for a clear understanding of the present invention.

At the transmission outputs of each respective row and column are gate circuits G18–G25 and G104–G111 for ensuring the proper polarity of the output signals delivered to terminals RX1–RX8 and RY1–RY8, respectively. Thus, the receive Y line at the output of gate circuit G10 in crosspoint circuit MG11, together with the outputs of the other gates corresponding to gate circuit G10 in the first column are connected to the input to gate circuit G104. Likewise the receive X outputs of matrix now MR1 are connected to gate circuit G18. As is shown in FIG. 2, the mark inputs to the matrix circuit shown in FIG. 1 are connected through binary reduction circuitry comprising a binary to "one out of N" decoder, so as to substantially reduce the number of input terminals necessary for energizing any particular cross-point circuit. For example, binary reduction gating circuitry for the horizontal or X connections is contained within the dotted line BCD–X. Three binary inputs MX1–MX3 are delivered thereto and eight digital outputs MKX1-MKX8 are supplied from gate circuits G80–G87. Gate circuits G58–G63 and G72–G79 convert the binary digital inputs applied to the circuit BCD–X into the required single digital output for marking the particular row of crosspoint circuits. Likewise, binary reduction gating circuitry BCD–Y for the vertical or Y connections converts binary inputs applied to terminals MY1–MKY8. Enabling gates G64 and G65 are also included to provide enabling signals for the binary reduction circuits BCD–X and BCD–Y, and for enabling the error detection gating circuitry shown in FIG. 3, as will be explained hereinbelow.

Figure 3:
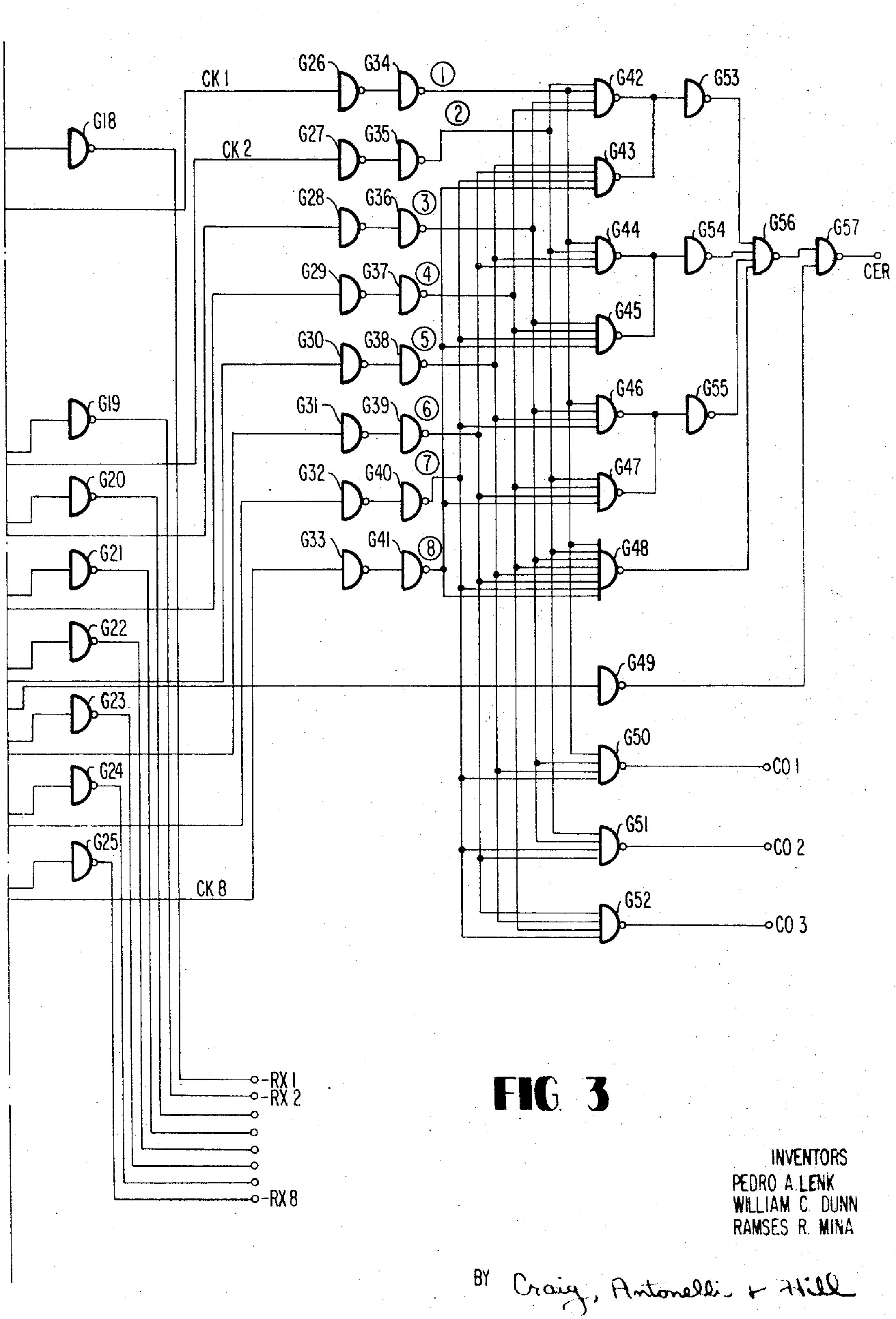

FIG. 3 depicts the circuitry of the present invention for determining which crosspoint circuits within a particular matrix are closed, and provides error signals in the event that more than one set (or no set) of crosspoint circuits in a vertical column or strip is closed. The circuit will identify the particular row in which the crosspoint circuit is closed in an individual Y matrix strip or column and generate an error signal in the event that no crosspoint circuit or more than one crosspoint circuit is closed. In response to the error signal, the crosspoint circuits in the Y matrix column being checked are dropped, removing the faulty connections (more than one crosspoint circuit), and in the event no crosspoint circuits are closed the signal to drop the crosspoint will have no effect. At the check outputs $CK_{11}$ – $CH_{18}$ of the 8 × 8 matrix switch shown in FIG. 1, gates G26–G33, shown in FIG. 3 are connected. These gates are connected through gate circuits G34–G41 to error detection gates G42–G48 which, in turn, are connected through logic circuitry including gates G53–G57. If more than one crosspoint circuit within a test vertical column is energized for providing a signal path therethrough, an error signal will appear at the output of gate G 57, when enabled by a check test signal from gate circuit G49 via the CE input to gate circuit G65, shown in FIG. 2. The logic circuitry comprising gate circuits G50–G52 provides a binary output identifying the row in which the crosspoint circuit is completed. In the event that more than one crosspoint circuit is erroneously completed in the single vertical column, the output at the leads CO1–CO3 is undefined.

OPERATION

When a particular data path is desired through an 8 × 8 crosspoint matrix array, the particular row and column of the selected crosspoint circuit must be marked and then held. Assuming that each of the crosspoint circuits is idle, and further assuming that signals are to be transmitted over the leads corresponding to the first row and first column within the matrix, crosspoint circuit MG11 will be selected; initially mark signals MKX1 and MKY1 are applied to set the crosspoint circuit MG11 and, subsequently or simultaneously, a continuous hold input signal is applied to lead $HI_1$ so as to provide an enable signal at one of the inputs of gate circuit G13. As was previously described, lead $HI_1$ is connected to each of the gates corresponding to the position of gate G13 within the first Y column. The hold signal, while present, maintains the crosspoint circuit MG11 operated so that the mark signal can be subsequently removed.

In order to provide the above mark signals MKX1 and MKY1, a binary one signal is applied to the inputs MX1–MX3 of the binary reduction gating circuit BCD–X as well as to the inputs MY1–MY3 of the binary reduction gating circuit BCD–Y. Within binary reduction gating circuit BCD–X, each of the gates G73–G79 will be disabled while gate G72 is partially enabled. Likewise, within binary reduction gating circuit BCD–Y only gate G88 will be partially enabled. When a mark "enable" signal is applied to the ME input of gate G64, gates G72 and G88 are enabled to apply mark signals to leads MKX1 and MKY1, respectively. These signals are, in turn, delivered to crosspoint circuit MG11. When gate G15, within crosspoint circuit MG11, receives the MKX1 and MKY1 signals it becomes energized, and its output will be inverted by gate G14 so as to energize one of the inputs to each gate G10, gate G11, gate G12 and G13.

Since the crosspoint circuits consist of NAND circuits, the application of a hold signal to gate circuit G13, over line $HI_1$, will provide an output on lead $HO_{11}$ to be delivered to gate G17 and will also be applied to the gate G14 allowing the crosspoint circuit to remain operated under the control of the hold signal HI, so that the mark signal can be removed.

With enabling signals applied from gate G14 to gates G10 and G11, crosspoint circuit MG11 is now ready to receive and send signals in both the horizontal and vertical directions over its respective SX1–RX1 and SY1–RY1 transmission leads. Since gate G10 is partially enabled by gate G14, a signal on lead SX1 will enable gate G10, thereby providing an output which is applied to gate G104, over lead RY1. Similarly, an input applied to lead SY1 will energize the input of Gate G11 to provide an output on lead RX1 through gate G18. Thus, duplex transmission is provided through crosspoint circuit MG11.

In a manner similar to that just described for energizing crosspoint circuit MG11, up to seven other crosspoint circuits within the 8 x 8 matrix array may be energized to provide 8 simultaneous duplex transmissions.

In other words, after crosspoint circuit MG11 is energized to provide a duplex transmission path crosspoint circuits MG22, MG33 . . . MG88, for example, may be energized. The only criteria being that each respective column and row have energized only a single crosspoint circuit contained therein. Thus, matrix row MR1 may not have crosspoint circuits MG11 and MG12 sized simultaneously or an error signal will be generated. Similarly crosspoint circuit MG11 may not be energized simultaneously with another crosspoint circuit in the first vertical column or strip.

Furthermore, a series of 8 × 8 matrices may be connected together to form a multiple path expansion switch. To provide the necessary network interconnections the "send" X lead SX of one stage will be connected to the "receive" Y lead SY of the next stage, the "receive" X lead RX of the one stage will be connected to the "send" Y lead SY of the next stage, and the hold output lead HO of one stage will be connected to the hold input lead HI of the next stage. In this manner, plural 8 × 8 matrices are held and marked sequentially since the energization of the hold output gates G17 provides the hold input signal for the next succeeding stage. To release a path through the matrices, it is only necessary to make the first hold input lead equal to zero, so as to deenergize gate G13, thereby disabling gates G10, G11 and G14 and providing a "disable" signal to the gate G17. Subsequently, the next 8 × 8 matrix gates one of which has been held by output lead of the preceeding matrix will be released.

As was previously discussed, error detection circuitry is provided to determine whether only one crosspoint circuit connected to a vertical column or strip is operated at any one time. Normally, only one crosspoint circuit per vertical column within an 8 × 8 array is used at a particular time, yet control errors may occur causing multiple crosspoint circuits within a vertical column to be operated.

If more than one crosspoint circuit of a vertical column 8 × 8 array is siezed, these multiple crosspoint circuits should be immediately released, since multiple connections are not desired and may cause errors within the system to which the switch is connected.

In order to determine which crosspoint, if any, of a vertical column in the 8 × 8 array is in use at any particular time, each crosspoint circuit includes a gating circuit such as gate G12 within crosspoint circuit MG11, as shown in FIG. 1. To determine which crosspoint circuits are operated in the 8 × 8 matrix, the vertical columns are sequentially scanned by applying mark signals thereto. For example, if a binary signal is applied to the leads MY1–MY3 corresponding to column 1 and a check enable signal CE is applied to the gate 65, a mark signal MKY1 is applied to the gates G12 in all crosspoint circuits associated with column 1. If the crosspoint circuit MG11 within the first row of the 8 × 8 array has been energized, an output will appear on the lead $CK_{11}$, so that a signal will be provided from the output of gate G16 over lead CK1. If no other crosspoint within the first column being tested is energized, no output will appear on any of the other leads CK2–CK8, so that the error checking logic shown in FIG. 3, will provide no output therefrom. However, if more than one matrix gate within a particular column being tested is energized, more than one of the output lines CK1–CK8 will provide a signal thereon, which will be detected by the error detection circuitry of FIG. 3. For a clear understanding of the operation of the error detection circuitry, the following truth table may be employed.

| Inputs from G34-G41 | | | | | | | | Gate outputs | | | | | | | |
|---|---|---|---|---|---|---|---|---|---|---|---|---|---|---|---|
| 1 | 2 | 3 | 4 | 5 | 6 | 7 | 8 | G42 | G53 | G44 | G54 | G40 | G55 | G48 | G57 |
| 1 | 1 | 1 | 1 | 1 | 1 | 1 | 1 | 0 | 1 | 0 | 1 | 0 | 1 | 0 | 1 |
| 0 | 1 | 1 | 1 | 1 | 1 | 1 | 1 | 0 | 1 | 0 | 1 | 0 | 1 | 1 | 0 |
| 0 | 0 | 1 | 1 | 1 | 1 | 1 | 1 | 0 | 1 | 0 | 1 | 1 | 0 | 1 | 1 |
| 0 | 1 | 1 | 1 | 0 | 1 | 1 | 1 | 1 | 0 | 0 | 1 | 0 | 1 | 1 | 1 |
| 1 | 1 | 0 | 1 | 1 | 0 | 1 | 1 | 1 | 0 | 1 | 0 | 1 | 0 | 1 | 1 |
| 1 | 1 | 1 | 0 | 1 | 1 | 0 | 1 | 1 | 0 | 0 | 1 | 1 | 0 | 1 | 1 |

Etc.

As can be seen, the output from G57 is 0 when there is a single input 0, and 1 when there are no 0 inputs or more than one 0 at the inputs.

For example, if crosspoint circuit MG11 within matrix row MR1 and crosspoint circuit MG 21 (not specially shown) within matrix row MR2 are energized, signals will be delivered on leads CK1 and CK2, gate circuits GC46 and GC47 will each detect a matrix row output, thereby causing gate circuit G55 to provide an error detection signal through gate G56, whereby an output will appear on lead CER at the output of gate circuit G57.

Within the error detection circuitry, consisting of gates G42–G48, gate circuit G48 is included to detect the absence of a closed crosspoint within the column which has been tested. Thus, if any crosspoint is supposed to be energized, but is not, gate circuit G48 will receive no input, thereby providing a disabling signal to gate G56, whereby an error signal will appear at the output of gate G57. Accordingly, the error detection circuitry is able to detect if more than one crosspoint circuit has been operated or if no crosspoint has been operated. In addition to the foregoing, if only one crosspoint is operated per column, the gates G50-G52 provide a binary output signal that identifies the matrix row in which the operated crosspoint circuit is located, by encoding binary form, the outputs of gate circuits G34–G41.

In view of the duplex capability afforded by the digital crosspoint switch of the present invention and the significantly reduced amount of logic circuitry employed, it can be seen that the present invention can be readily formed on an integrated circuit chip. Furthermore, because of the binary reduction circuitry included, a significant decrease in the number of allotted terminals is afforded. As can be seen in FIG. 2, for marking and checking purposes, only 8 input terminals are required to mark and check the X and Y crosspoints. This amounts to a significant saving in space, since normally 16 leads would be necessary for marking the respective X and Y rows and columns within an 8 × 8 matrix. This is particularly advantageous in present day switching systems where compact equipment is necessary to provide more complex types of service to more customers.

Furthermore, because of its solid state configuration, the multiple crosspoint matrix switch of the present invention has a high frequency handling capability on the order of several megahertz ( as compared with a frequency of 10 kilohertz for a relay system ), so as to allow rapid time division multiplex signalling through the switch.

We claim:

1. A digital switching network comprising:

a plurality of crosspoint circuits arranged in a matrix array forming horizontal and vertical strips respectively, and having two pairs of input and output connections for receiving and sending digital data signals through each of the respective inputs and outputs ;

means , connected to said crosspoint circuits of said matrix array, for marking and seizing the crosspoint circuits within said matrix array, through which a digital data path is to be provided; and means, connected to said matrix array, for detecting the number of operated crosspoint circuits within individual strips and for providing an error signal indicating the operation of other than a single crosspoint circuit within one strip.

2. A digital switching network according to claim 1, wherein said error signal providing means comprises means , connected to each crosspoint circuit, for preventing said error signal from being provided in response to multiple crosspoint circuits in said matrix array being operated, as long as each respective horizontal and vertical strip of crosspoint circuits has only a single crosspoint circuit therein operated.

3. A digital switching network according to claim 1, wherein each crosspoint within said matrix array further includes terminal connections for marking and seizing paths therefor and wherein each network further includes binary reduction circuitry connected to the respective mark terminals of each crosspoint circuit within said array so as to substantially reduce the number of external terminals required for energizing any selected crosspoint circuit within said array.

4. A digital switching network according to claim 3, wherein each crosspoint circuit comprises matrix gating circuitry having a first gating circuit to one input of which a crosspoint circuit holding signal is applied through said seizing means for seizing said crosspoint circuit, and a second gating circuit, the output of which is coupled to an input of said first gating circuit, having its inputs connected to said marking means for marking a selected crosspoint circuit through which data signals are to be transmitted.

5. A digital switching network according to claim 4, wherein each crosspoint circuit further includes a pair of transmission gate circuits, responsive to the output of said second gating circuit, for coupling data signals, applied to the data lines associated with said crosspoint circuits , through said crosspoint circuits , whereby a marked and seized crosspoint circuit may send and receive data signals therethrough.

6. A digital switching network according to claim 5, wherein each crosspoint circuit further includes a third gating circuit responsive to the outputs of said first and second gating circuits for disabling said pair of transmission gate circuits upon the release of said first and second gating circuits, in response to the absence of crosspoint circuit holding and marking signals applied respectively thereto.

7. A digital switching network according to claim 6, wherein each row of crosspoint circuits within said matrix array further includes a fourth gating circuit connected to the output of each first gating circuit connected to the output of each first gating circuit within the respective crosspoint circuits of said row for providing an output holding signal, whenever any crosspoint circuit within said row is seized.

8. A digital switch network according to claim 6, wherein each row of crosspoint circuits within said matrix array further includes a fifth gating circuit connected to the outputs of each said third gating circuit within said row for providing a crosspoint circuit enabled signal to said error detecting means in response to a crosspoint circuit marking signal applied to any of said third gating circuits within said row.

9. A digital switching network according to claim 8, wherein said error detecting means includes a first plurality of logic gates responsive to the outputs of each of said fifth gating circuits for providing a first error signal in response to the energization of more than a single fifth gating circuit.

10. A digital switching network according to claim 9, wherein said error detecting means further includes a sixth gating circuit responsive to the outputs of each of said fifth gating circuits for providing a second error signal in response to the energization of none of said fifth gating circuits.

11. A digital switching network according to claim 10, wherein said error detecting circuit further includes a seventh gating circuit responsive to the outputs of said first plurality of logic gates and said sixth gating circuit for generating a fault indication signal in response to either of said first or second error signals.

12. A digital switching network according to claim 9, wherein said error detecting means further includes a second plurality of logic gates responsive to the outputs of each of said fifth gating circuits for providing fault location signals representing improperly energized crosspoint circuits.

13. A digital switching network according to claim 11, further including fault checking and mark enabling gate circuits connected to said binary reduction circuitry and said seventh gating circuit for enabling the application of mark signals to said crosspoint circuits and said fault indication signal.

14. In a digital switching network having a plurality of crosspoint circuits arranged in a matrix array, forming horizontal and vertical matrix strips respectively, input and output connections applied thereto for receiving and sending digital data signals therethrough and means for operating at least one of said crosspoint circuits in said matrix, through which a digital data path is to be provided, an error checking arrangement comprising means, responsive to the operation of each of said crosspoint circuits, for determining whether only one crosspoint circuit per matrix strip is operating.

15. An error checking arrangement according to claim 14, comprising means, responsive to the operation of a crosspoint circuit within a matrix strip, for identifying the location of the matrix strip orthogonal thereto in which said crosspoint circuit is located.

16. An error checking arrangement according to claim 14, wherein each crosspoint circuit within said matrix array includes terminal connections for marking, seizing and data sending and receiving paths therethrough.

17. An error checking arrangement according to claim 14, wherein each crosspoint circuit comprises matrix gating circuitry having a first gating circuit to one input of which a crosspoint circuit holding signal is applied through said seizing means for seizing said crosspoint circuit, and a second gating circuit, the output of which is coupled to an input of said first gating circuit, having its inputs connected to said marking means for marking a selected crosspoint circuit through which data signals are to be transmitted.

18. An error checking arrangement according to claim 17, wherein each crosspoint further includes a pair of transmission gate circuits responsive to the output of said second gating circuit, for coupling data signals applied to the data lines associated with said crosspoints , through said crosspoint circuits, whereby seized and marked crosspoint circuit may send and receive data signals therethrough.

19. An error checking arrangement according to claim 18, wherein each crosspoint circuit further includes a third gating circuit responsive to the outputs of said first and second gating circuits for disabling said pair of transmission gate circuits upon the release of said first and second gating circuits, in response to the absence of crosspoint circuit holding and marking signals applied respectively thereto.

20. An error checking arrangement according to claim 19, wherein each row of crosspoint circuits within said matrix array further includes a fourth gating circuit connected to the output of each first gating circuit within the respective crosspoint circuit of said row for providing an output holding signal, whenever any crosspoint circuit within said row is seized.

21. An error checking arrangement according to claim 20, wherein each row of crosspoint circuits within said matrix array further includes a fifth gating circuit connected to the outputs of each of said third gating circuit within said row for providing a crosspoint circuit enabled signal to said error detecting means in response to a crosspoint circuit marking signal applied to any of said third gating circuits within said row.

22. In a digital switching network according to claim 14, wherein said error detecting arrangement includes a first plurality of logic gates responsive to the outputs of each crosspoint for generating a first error signal in response to the energization of more than a single crosspoint circuit within any strip.

23. In a digital switching network according to claim 14, wherein said error detecting arrangement further includes a logic circuit responsive to the outputs of each of said crosspoint circuits for generating an error signal in response to the energization of none of said crosspoint circuits.

24. In a digital switching network according to claim 22, wherein said error detecting arrangement further includes a logic circuit responsive to the outputs of each of said crosspoint circuits for generating a second error signal in response to the energization of none of said crosspoint circuits.

* * * * *

UNITED STATES PATENT AND TRADEMARK OFFICE
CERTIFICATE OF CORRECTION

PATENT NO. : 3,731,275
DATED : May 1, 1973
INVENTOR(S) : Pedro A. Lenk, et al

It is certified that error appears in the above-identified patent and that said Letters Patent are hereby corrected as shown below:

| | |
|---|---|
| In the Abstract, last line | "operates" should read ---operated---. |
| Col. 1, line 16 | "limit" should read ---limits---. |
| Col. 5, line 47 | After "lead" insert ---HO---. |
| Col. 8, line 20 | Delete "switch" and insert therefor ---switching---. |

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*